United States Patent [19]
Kang

[11] Patent Number: 5,774,307
[45] Date of Patent: Jun. 30, 1998

[54] HEAD DRUM ASSEMBLY DESIGNED TO PREVENT A MAGNETIC TAPE FROM ADHERING TO A DRUM SURFACE

[75] Inventor: Dong-Ho Kang, Seoul, Rep. of Korea

[73] Assignee: Daewoo Electronics Co., Ltd., Rep. of Korea

[21] Appl. No.: 824,481

[22] Filed: Mar. 26, 1997

[30] Foreign Application Priority Data

Mar. 28, 1996 [KR] Rep. of Korea .......................... 96-8773

[51] Int. Cl.[6] .................................................. G11B 15/61
[52] U.S. Cl. ............................................................ 360/107
[58] Field of Search ............................................. 360/107

[56] References Cited

U.S. PATENT DOCUMENTS 5,265,084 11/1993 Ozue et al. .............................. 360/107
5,359,475 10/1994 Aseere et al. .............................. 360/85

FOREIGN PATENT DOCUMENTS 0383588 8/1990 European Pat. Off. .
60-237663 11/1985 Japan .
1016925 1/1966 United Kingdom .

*Primary Examiner*—Robert S. Tupper
*Attorney, Agent, or Firm*—Pennie & Edmonds LLP

[57] ABSTRACT

A head drum assembly comprises a plurality of vent holes formed through an upper drum to allow an air under the upper drum to communicate with an air above the upper drum, a flange member for making an air flow within a space between the upper drum and a lower drum, in response to a rotational movement of the upper drum, in such a manner that air is introduced through the vent holes and is radially outwardly flown away from the space, and a plurality of outlet ports for guiding the flown air to apply the flown air against a magnetic tape retained around the head drum assembly.

6 Claims, 4 Drawing Sheets

HEAD DRUM ASSEMBLY DESIGNED TO PREVENT A MAGNETIC TAPE FROM ADHERING TO A DRUM SURFACE

FIELD OF THE INVENTION

The present invention is directed to a head drum assembly for use in a video cassette recorder; and, more particularly, to an improved head drum assembly capable of preventing a magnetic tape from adhering exceedingly to a guiding lateral surface of the head drum assembly and maintaining an uniform contact between the magnetic tape and a video head.

DESCRIPTION OF THE PRIOR ART

In a normal video cassette recorder or a digital video cassette recorder, a video head is subjected to a frictional force resulting from a contact with a running magnetic tape during a reproducing mode, a recording mode, a review mode and etc. The closer the contact between the magnetic tape and the video head or the higher the rotational speed of the video head or the running speed of the magnetic tape causes the frictional force to increase. A high frictional force may hinder the magnetic tape from smoothly travelling or running around the head drum assembly; and may even damage, in conjunction with the video head, a surface of the magnetic tape.

In order to reduce the frictional force between the magnetic tape and the video head, a plurality of grooves are normally provided on a guiding lateral surface of an upper drum to generate an air layer between the magnetic tape and the guiding lateral surface in various types of known head drum assemblies. The force provided by the air layer, however, is usually not enough to keep the magnetic tape from adhering to the guiding lateral surface of the upper drum and hence the video head.

On the other hand, since the magnetic tape is moved by a rotational force of a capstan shaft cooperating with a pinch roller, a portion of the magnetic tape positioned closer to the capstan shaft is subjected to a greater tension stress than the rest of the magnetic tape. Accordingly, each of the video heads is urged by the magnetic tape with different levels of depressing force. As a result, it is difficult for the video head to stably read/write information from/on the magnetic tape.

SUMMARY OF THE INVENTION

It is, therefore, a primary object of the invention to provide a head drum assembly capable of preventing a magnetic tape from adhering to a guiding lateral surface of the head drum assembly and maintaining an uniform contact between the magnetic tape and a video head.

The above and other objects of the invention are accomplished by providing a head drum assembly comprising: a plurality of vent holes formed through an upper rotational drum to allow an air under the rotational drum to communicate with an air above the rotational drum; an air pump means for making an air flow within a space between the rotational drum and a stationary drum, in response to a rotational movement of the upper drum, in such a manner that air is introduced through the vent holes and is radially outwardly flown away from the space; and a plurality of outlet ports for guiding the flown air to apply the flown air against a magnetic tape retained around the head drum assembly.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Preferred embodiments of a head drum assembly in accordance with the present invention will be described hereinbelow.

Figure 1:
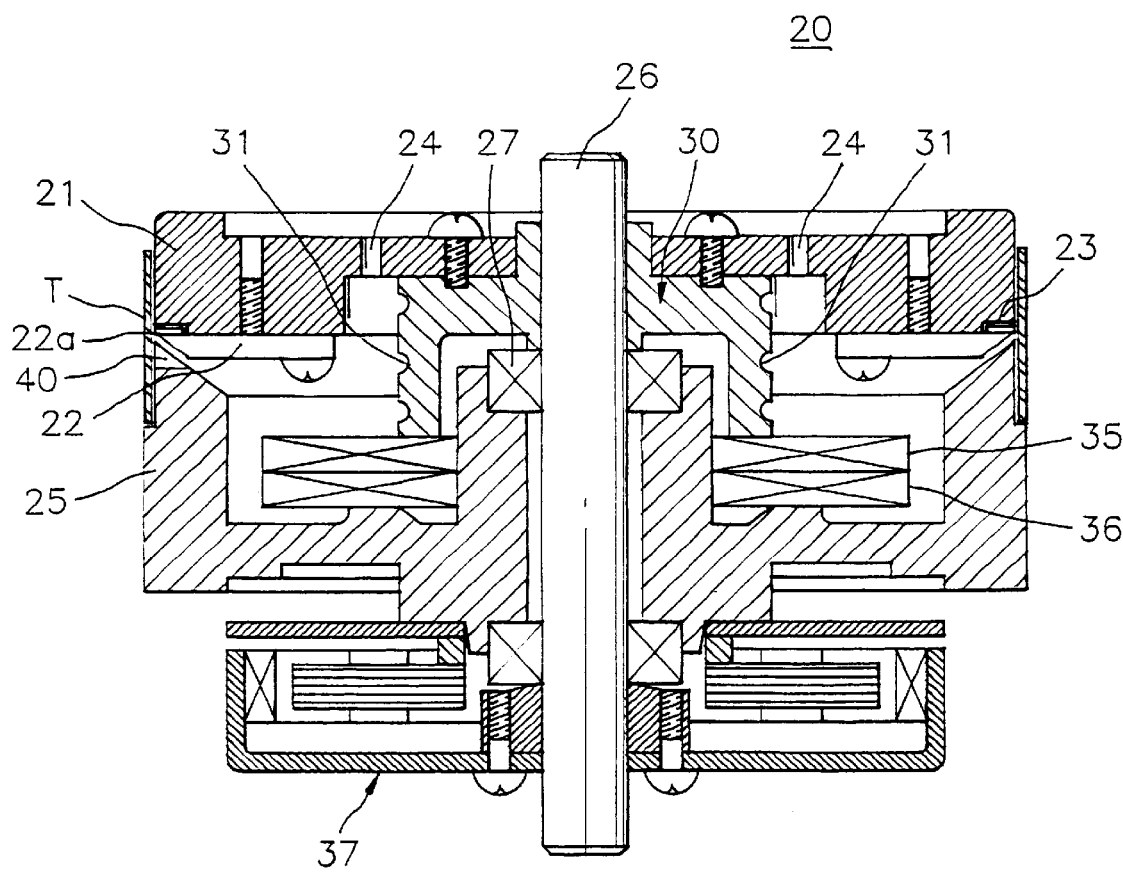
FIG. 1 shows a longitudinal sectional view of a head drum assembly in accordance with the present invention.

Referring to FIG. 1, the inventive head drum assembly 20 has a rotational drum 21 provided with a plurality of video heads 22. Each of the video heads 22 is mounted near a head window 23 through which the video head 22 is communicated with outside of the head drum assembly 20 so that a head chip portion 22a slightly protrudes above a lateral surface of the rotational drum 21. The rotational drum 21 has a plurality of vent holes 24 through which an outside air is introduced into a space under the rotational drum 21.

Fixedly mounted under the rotational drum 21 is a stationary drum 25 which supports a rotating shaft 26 via a pair of ball bearing sets 27. The stationary drum 25 is vertically slightly spaced apart from the rotational drum 21 so as to maintain a required separation between an rotor transformer 35 and a stator transformer 36 so that a lateral gap exists between the rotational and the stationary drums 21 and 25.

The rotating shaft 26, which is rotated by a driving motor 37, is closely fitted into a flange 30; and the flange 30 is connected with the rotational drum 21 through a plurality of screws. A reference symbol T represents a magnetic tape retained around the head drum assembly 20.

Figure 2:
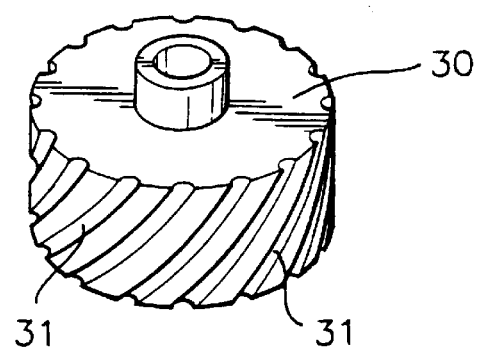
FIG. 2 represents a perspective view of a flange with helical grooves used in the inventive head drum assembly.
Figure 3:
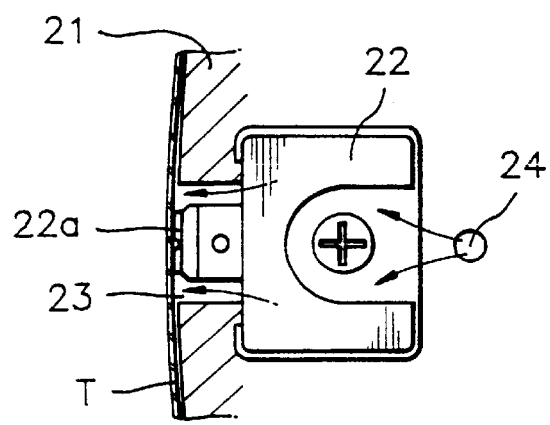
FIG. 3 depicts a schematic view of a bottom of an upper rotational drum showing an air flow within the inventive head drum assembly.
Figure 4:
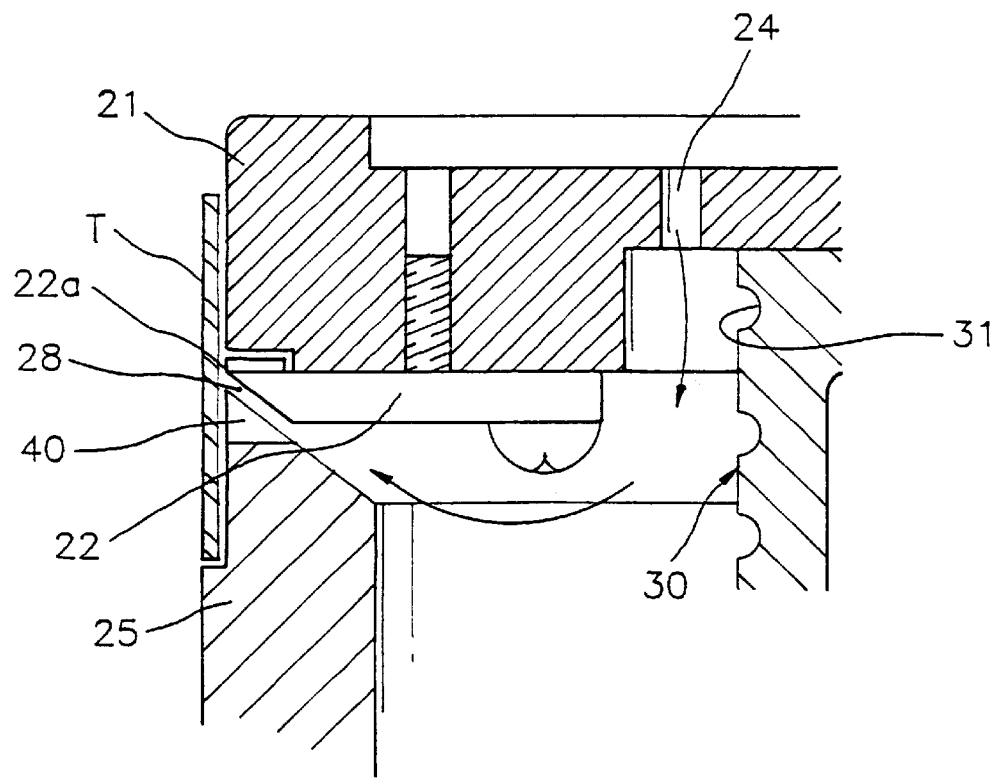
FIG. 4 illustrates a partial sectional view of the inventive head drum assembly.

Referring to FIG. 2, the flange 30 employed in the inventive head drum assembly 20 has on its flank portion a plurality of helical grooves 31 regularly spaced apart. The helical grooves 31 function to generate an air flow within a space defined with a bottom of the rotational drum 21 and a top of the stationary drum 25, as shown in FIG. 1. Each of the helical grooves 31 extends from an upper end to a lower end of the flange 30; and has a helical configuration to generate an air flow in a direction toward the stationary drum 25 when the flange 30 rotates counterclockwise, i.e., in a direction indicated by the arrow in FIG. 2. A cross-section of the groove 31 is, preferably, of a semi-circular configuration. Meanwhile, the rotor transformer 35 is kept on a bottom of the flange 30.

Detailed description of the air flow generation in the inventive head drum assembly 30 is now described with reference to FIGS. 1 through 4.

When the driving motor 37 is energized, the flange 30 together with the rotational drum 21 rotates, normally counterclockwise, as shown in FIG. 2. The rotation of the flange 30 forces the air occupied within the space between the rotational and the stationary drums 21 and 25 to flow toward the stationary drum 25, allowing an outside air to be introduced into the space via the plurality of vent holes 24, as indicated by the arrows in FIG. 4. As a result, the air occupied within the space is first pressurized and radially outwardly flows, as indicated by the arrows in FIGS. 3 and 4. The generated air flow from the vent hole 24 toward a lateral edge of the head drum assembly 20 serves to prevent the magnetic tape T from tightly adhering to lateral guiding surfaces of the rotational and stationary drums 21 and 25.

Figure 5:
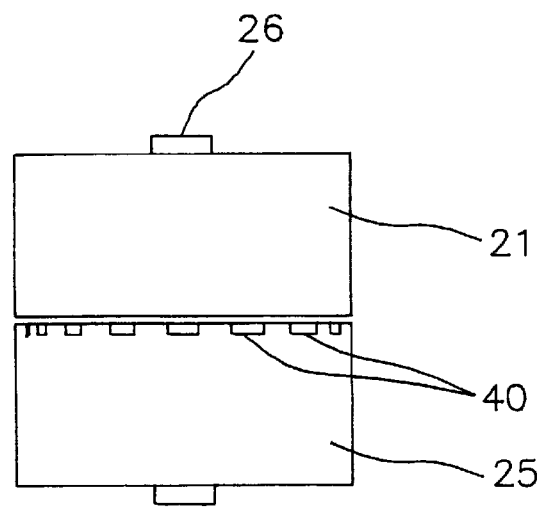
FIGS. 5 and 6 offer a side elevational view and a top view of a first preferred embodiment of the inventive outlet ports, respectively.
Figure 6:
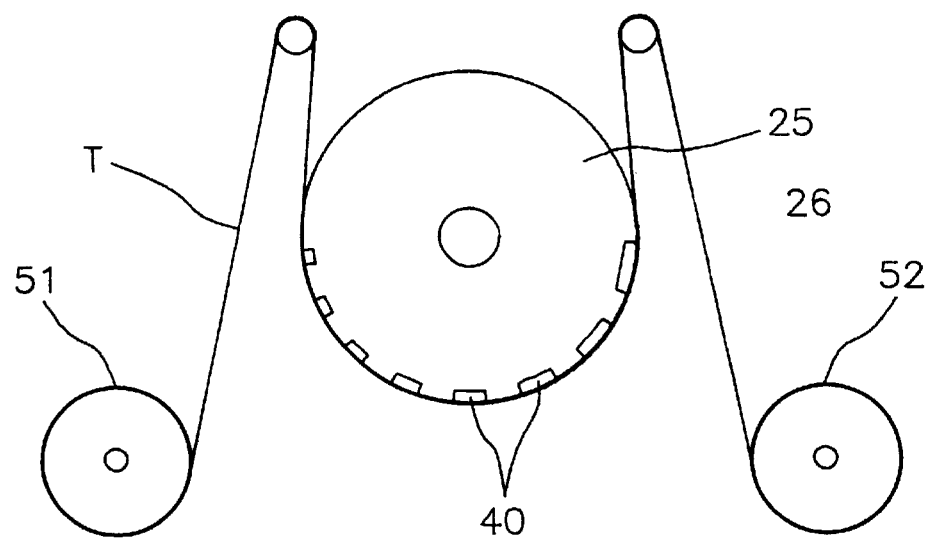

Referring to FIGS. 5 and 6, a plurality of outlet ports 40 are formed with the stationary drum 25, through which the flown air reaches the magnetic tape T. The outlet ports 40 guide the air flow and control an amount of the air jetted against sections of the magnetic tape depending on a level of tension applied on each section thereof in order to accomplish an uniform contact between the video head and the magnetic tape. That is, since the magnetic tape is normally moved by a rotational force of a take-up reel 52 and/or a capstan shaft (not shown), a portion of the magnetic tape positioned closer to the take-up reel 52 is subjected to a greater tension than the rest of the magnetic tape. As a result, the video head in contact with the magnetic tape with a higher tension is subjected to more severe depressing force applied by the magnetic tape. In this reason, the outlet ports 40 are formed to apply a larger amount of the air against the higher-tensioned magnetic tape.

In accordance with a first preferred embodiment of the present invention, the outlet ports 40 are arranged along a periphery of the stationary drum 25, with substantially a same separation therebetween, to communicate with the space between the rotational and the stationary drums 21 and 25. The dimension of outlet ports 40 becomes progressively larger along a travelling direction of the magnetic tape, i.e., a direction from a supply reel 51 toward a take-up reel 52, as shown in FIG. 6.

Figure 7:
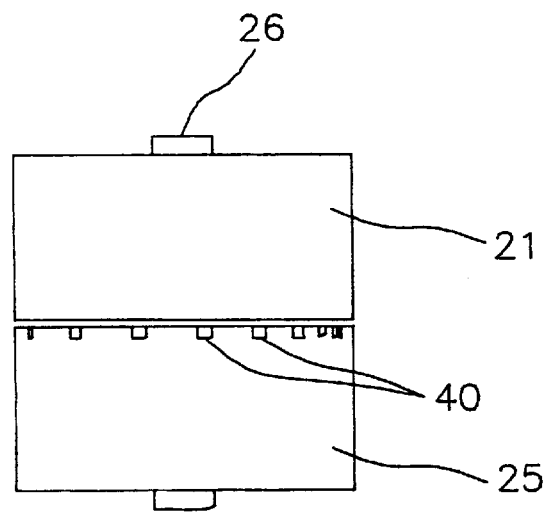
FIGS. 7 and 8 show a side elevational view and a top view of a second preferred embodiment of the inventive outlet ports, respectively.
Figure 8:
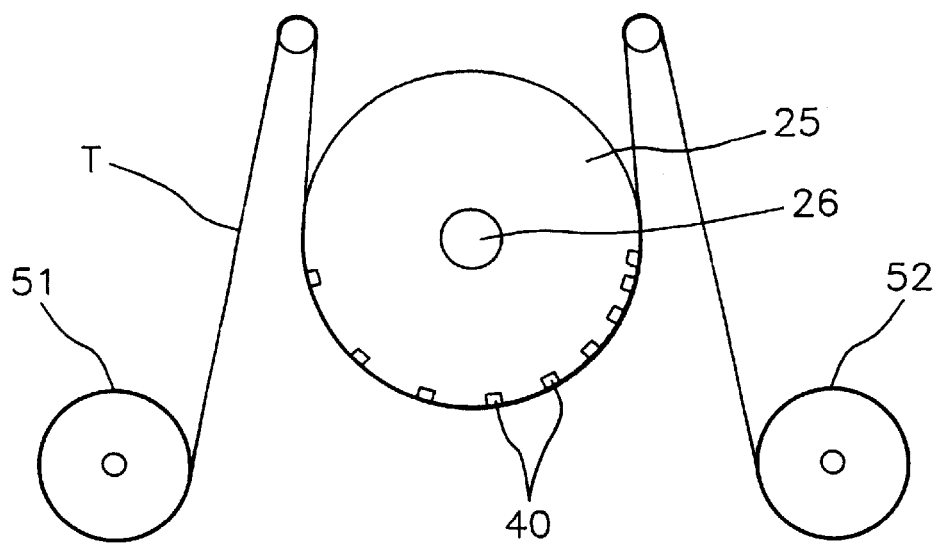

Referring to FIGS. 7 and 8 showing a second preferred embodiment, the outlet ports 40 are dimensioned substantially the same and are arranged along the periphery of the lower drum to communicate with the space. However, the separation between adjacent outlet ports becomes progressively smaller along the travelling direction of the magnetic tape.

In accordance with the present invention, the outside air is forced into the head drum and to flow toward the outlet ports 40 through the space between the rotational and the stationary drums 21 and 25 by the rotation of the flange 30, thereby preventing the magnetic tape from exceedingly adhering to the video head and maintaining the uniform contact between the two over an entire contact range. As a result, the magnetic tape is able to travel around the head drum stably without damage and the readability/writability of the video head is enhanced in the inventive head drum assembly.

Although the invention has been shown and described with respect to the preferred embodiments, it will be understood by those skilled in the art that various changes and modifications may be made without departing from the spirit and scope of the invention as defined in the following claims.

What is claimed is:

1. A head drum assembly comprising:

a plurality of vent holes formed through an upper drum to allow air above the upper drum to be in communication with a space disposed between the upper drum and a lower drum;

wherein an air flow is created within the space in response to a rotational movement of the upper drum, in such a manner that air is introduced through the vent holes and is radially and outwardly directed away from the space; and a plurality of outlet ports for guiding the directed air against a magnetic tape retained around the head drum assembly wherein the plurality of outlet ports are arranged along a periphery of the lower drum, having substantially same separation therebetween, to communicate with the space and wherein dimension of the outlet ports becomes progressively larger along a travelling direction of the magnetic tape.

2. A head drum assembly comprising;

a plurality of vent holes formed through an upper drum to allow air above the upper drum to be in communication with a space disposed between the upper drum and a lower drum;

wherein an air flow is created within the space in response to a rotational movement of the upper drum, in such a manner that air is introduced through the vent holes and is radially and outwardly directed away from the space, and a plurality of outlet ports for guiding the directed air against a magnetic tape retained around the head drum assembly wherein the plurality of outlet ports have substantially the same dimension and are arranged along a periphery of the lower drum to communicate with the space, and wherein the separation between the outlet ports progressively becomes smaller along a travelling direction of the magnetic tape.

3. A head drum assembly provided with a rotating shaft, a rotary drum adapted to rotate with the rotating shaft, a stationary drum for rotatably supporting the rotating shaft and a plurality of video heads for reading/writing information from/on a magnetic tape running by a take-up reel, being retained around the head drum assembly, said assembly comprises:

a plurality of vent holes formed through the rotary drum to allow a space under the rotary drum to communicate with a space above the rotary drum;

a flange for generating an air flow within the space under the rotary drum, in response to a rotational movement of the rotary drum, in such a manner that air is introduced through the vent holes and is radially and outwardly directed away from the space, the flange being fixed to the rotating shaft and having on its flank surface a plurality of helical grooves substantially evenly spaced from each other to allow air contained in the space to flow toward the stationary drum when the flange rotates; and an outlet means for guiding the generated air flow against the magnetic tape retained around the head drum assembly in such a manner that a larger amount of the air is applied against a portion of the magnetic tape closer to the take-up reel.

4. The head drum assembly of claim 3, wherein said outlet means comprises a plurality of outlet ports being arranged along a periphery of the stationary drum, with substantially a same separation therebetween, to communicate with the space and wherein the dimension of the outlet ports becoming progressively larger along a forwarding direction of the magnetic tape.

5. The head drum assembly of claim 3, wherein said outlet means comprises a plurality of outlet ports having substantially the same dimension and being arranged along a periphery of the stationary drum to communicate with the space, wherein the separation between the outlet ports becomes progressively smaller along a forwarding direction of the magnetic tape.

6. The head drum assembly of claim 3, wherein a cross-section of each of the helical grooves is of a semi-circular configuration.

* * * * *